United States Patent
Bartilson

(10) Patent No.: US 7,642,755 B2
(45) Date of Patent: Jan. 5, 2010

(54) METHOD AND APPARATUS TO MAXIMIZE STORED ENERGY IN ULTRACAPACITOR SYSTEMS

(76) Inventor: Bradley Wayne Bartilson, 10 River Run Hollow Rd., Columbia, NJ (US) 07832

( * ) Notice: Subject to any disclaimer, the term of this patent is extended or adjusted under 35 U.S.C. 154(b) by 256 days.

(21) Appl. No.: 11/613,014

(22) Filed: Dec. 19, 2006

(65) Prior Publication Data

US 2008/0143301 A1 Jun. 19, 2008

(51) Int. Cl.
*H02J 7/00* (2006.01)
*B60L 1/00* (2006.01)

(52) U.S. Cl. .......................... 320/167; 307/9.1
(58) Field of Classification Search ................. 320/140, 320/166, 167, FOR. 149; 323/281, 282, 323/283, 284, 285, 901; 363/59, 97, 106; 307/9.1, 10.1; 318/86, 87, 88, 152, 376, 318/717, 800; 180/65.2
See application file for complete search history.

(56) References Cited

U.S. PATENT DOCUMENTS

| | | | |
|---|---|---|---|
| 5,910,722 A | 6/1999 | Lyons et al. | |
| 6,265,851 B1 | 7/2001 | Brien et al. | |
| 6,394,209 B1 | 5/2002 | Goehring et al. | |
| 6,437,544 B1 * | 8/2002 | Yang | 320/167 |
| 6,464,026 B1 | 10/2002 | Horsley et al. | |
| 6,724,100 B1 | 4/2004 | Gabriel | |
| 6,876,098 B1 | 4/2005 | Gray, Jr. | |
| 7,004,273 B1 | 2/2006 | Gruenwald et al. | |
| 7,078,877 B2 | 7/2006 | Salasoo et al. | |
| 7,109,686 B2 | 9/2006 | Schulte et al. | |
| 7,138,730 B2 | 11/2006 | Lai | |
| 7,248,030 B2 * | 7/2007 | Yoshino | 323/284 |
| 2007/0181355 A1 | 8/2007 | Harris | |

FOREIGN PATENT DOCUMENTS

WO WO 2005078892 A1 * 8/2005

* cited by examiner

*Primary Examiner*—Edward Tso
*Assistant Examiner*—M'Baye Diao
(74) *Attorney, Agent, or Firm*—Woodcock Washburn LLP

(57) ABSTRACT

The control system for an UltraCapacitor (or "SuperCapacitor) based energy storage system consists of a relay switch, a voltage up-converting device (e.g. DC-DC converter), regulated power supplies and a comparator circuit. The comparator circuit compares the storage system output voltage with a reference voltage, causing the storage system output to be diverted through a voltage up-converting device when the said voltage has declined to a threshold value (typically set by the load requirements). Wide-input range power supplies enable consistent operation of the circuit as the UltraCapacitor system output bus voltage declines. The wide-range of input allowed by the up-converting device enables the continuance of power drain from the UltraCapacitors, i.e. more efficient use of available storage capacity, while maintaining the required output voltage to the load. Efficiency is increased by direct connection of the UltaCapacitor system to the load bus until its voltage falls below stated threshold. In the case of a given 48 VDC system electric motor application, 500% more energy is extracted from the UltraCapacitor system with the stated control system than would be permitted by the load voltage requirements without such system.

15 Claims, 2 Drawing Sheets

METHOD AND APPARATUS TO MAXIMIZE STORED ENERGY IN ULTRACAPACITOR SYSTEMS

BACKGROUND OF THE INVENTION

The present invention relates to an apparatus and method to extract a larger portion of the available energy capacity of "Ultra-Capacitor" (or "Super-Capacitor") energy storage systems (ESS).

DESCRIPTION OF RELEVANT ART

Newly-developed Ultra-Capacitor (UC) technology, enables extreme advances in the rate of serving large amounts of charge to and from an energy storage system, e.g. discharging at 1000 A for 30 seconds. UCs exhibit high charge and discharge efficiency (~98%), and a significant advantage in applications where energy efficiency improvement is desired. UCs provide a large scale increase in power density (10 kW/kg) over the most advanced batteries today (1 kW/kg).

In order to fully-extract the energy from an Ultra-Capacitor System (UCS), they must undergo a large voltage decrease, causing system output voltage issues. Additionally, UCs exhibit lower energy density (1-20 W-hr/kg) than batteries (50-100 W-hr/kg). The use of UCs in combination with batteries first appears to address the apparent shortcomings of both technologies, however, the peculiar charging/discharging characteristics of the battery component must still be addressed in the operational algorithm. The UCS-battery combination in series connection limits the current to that of the battery limits. Operating the UCS-battery in parallel limits the extraction of total energy from the UCS to that of the battery, a considerable reduction.

Others have identified approaches with switched banks of UC's, or in combination with batteries, to avert the extreme voltage reduction that would be experienced by continuing to draw from a single UC. However, this methodology results in significant underutilization of the capability of the UCS (typically less than 50% as voltage input variations are limited to 2:1 for many devices). The additions of banks (either battery or UC) bring increased switching components/complexity, efficiency loss, increased weight (reducing vehicle efficiency) and cost.

U.S. Pat. No. 6,265,851 describes an electric vehicle power system for a semiconductor wafer handling application, having ultracapacitors and batteries as parallel sources connected to a source-selecting switch and having said switch direct its output only to a DC-DC converter which serves the motor load, however, this incurs the converter losses when no conversion is necessary.

Laid open US Pat App. US 2004/0100149 describes topologies for multiple energy sources, including UCs, and accommodates reverse power flow from the utility being driven (case of regenerative braking for a transportation vehicle). In the described topologies, all power is continuously directed through a power converter module, with inherent losses and limitations per device sizing.

U.S. Pat. No. 7,004,273 discusses a bank of ultracapacitors directly bussed to an engine-driven generator with a control management unit bringing the engine on and off to maintain the state-of-charge of the ultracapacitors. This approach does not address the inefficient ultracapacitor capacity utilization issue, resulting in extensive burden/cycling of the engine and/or significant oversizing of the ultracapacitor bank.

U.S. Pat. No. 7,109,686 describes the use of braking resistor and switch structure to assist in charging and discharging an ultracapacitor bank and to protect the ultracapacitor from excessive pre-charge current. A DC-DC converter is referenced as expensive, and its use is referenced only as an alternative method to pre-charge the ultracapacitor bank. While low in cost the use of the braking resistor diverts energy, thereby wasting said energy.

SUMMARY OF THE INVENTION

The present invention addresses the primary factors identified in the background art which limit the capability of a UC-based storage system to deliver its maximum energy and power capabilities, and to achieve maximum efficiency as viewed from the application level. More specifically, the apparatus and method of this invention constitute significant advancements over the background art, as evidenced by the following objects.

An object of the invention is to extract the maximum available energy from a UC-based storage system (UCS).

Another object is to obtain high efficiency in energy transfer to and from the UCS.

Another object is to reduce energy losses of the application system by reducing the mass of the UCS system.

Another object is to reduce the complexity, cost, and component stress of the ESS control system.

Another object is to reduce energy losses by matching the energy charge/discharge capabilities of the UCS to that of the application system conditions, e.g. to readily transfer the burst of regenerative braking energy to the UCS with minimal loss.

Additional objects and advantages of the invention are advanced by the following description and may also be learned from the practice of the invention.

In brief summary, the foregoing objects are achieved by an apparatus which comprises: an UCS having a control circuitry which diverts the UCS output to a DC-DC converter when a threshold voltage, or state-of-charge (SOC) has been reached in the UCS system.

BRIEF DESCRIPTION OF THE DRAWINGS

The appended drawings depict specific embodiments of the described invention as to render understanding of the invention, however, they are not to be considered limiting of the scope of the invention. The drawings illustrate only typical, and presently understood, best use mode of the invention.

DETAILED DESCRIPTION OF THE INVENTION

The present invention embodies an ESS system 5 comprising a UCS 3 (configuration of one or more "Ultra" or "Super" Capacitors) that receives supply energy from a DC source 1, stores such energy, supplies energy to a load or parallel configuration of DC loads, and may receive and store energy returning from the former loads.

Figure 1:
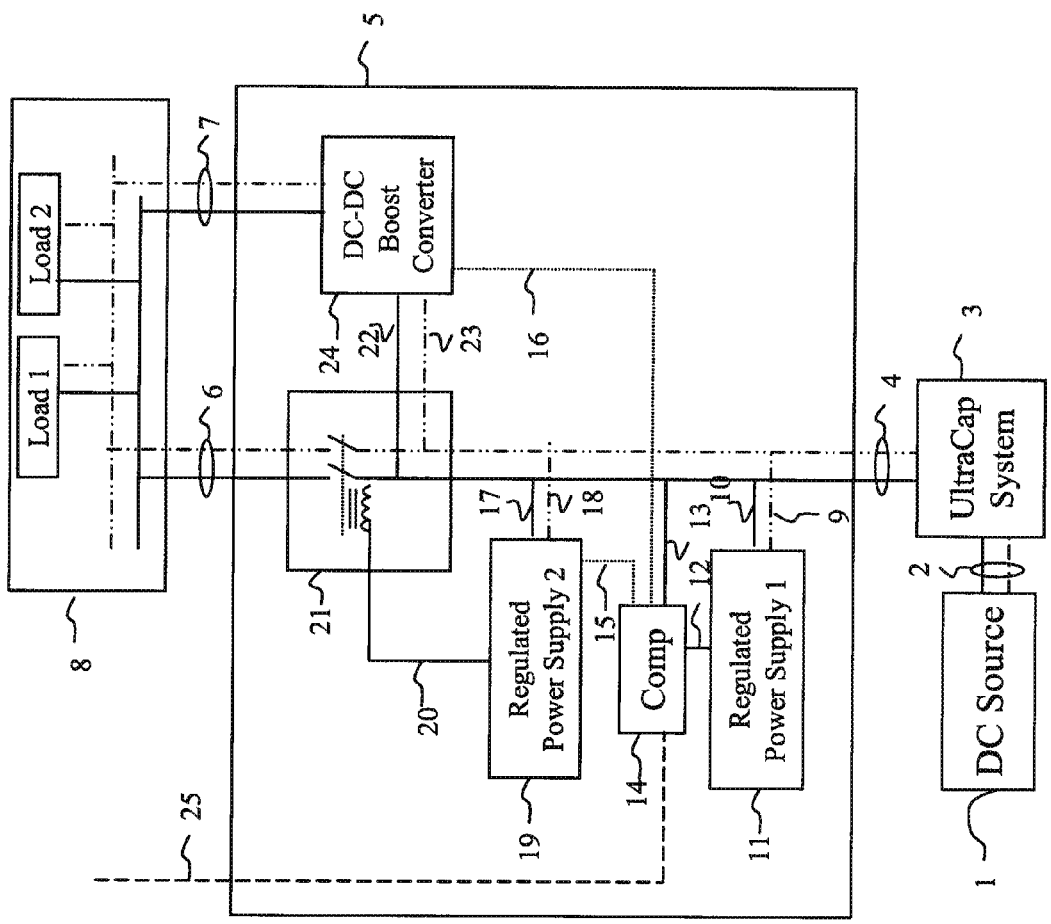
FIG. 1 is a schematic of the UCS with the control circuit

FIG. 1 illustrates the schematic of the ESS 5. Therein a DC Source 1 renders power as demanded by a higher-level application control system (a typical control system operates the DC source in response to load or bus or other application system conditions). Energy from said DC Source 1 is fed to UCS 3 via electrical connectors 2. UCS 3 contains an application-defined capacity and configuration of UCs. UCS energy is fed to the ESS 5 Control System via connection bus 4. The Comparator Circuit 14 monitors the high voltage side of the feed bus 4 via connector 13. When the feed bus 4 high voltage falls beneath a threshold value the Comparator Circuit 14 releases the inhibit signal line 16 inducing the on-state of the DC-DC Boost Converter 24.

Bus Connections 22, 23 supply power to the DC-DC Converter 24 which is connected to common terminals of the Contactor 21 (or equivalent functioning switch device). Contactor 21 is in a normally-closed condition when the UCS bus 4 voltage is above the low-voltage threshold previously described. Under low UCS bus 4 voltage the Comparator Circuit 14 releases an inhibit release signal via connection line 15 to a regulated supply 19 which energizes the coil of Contactor 21, thus directing all power flow from the UCS 3 to the DC-DC Converter 24 for up-conversion to the requisite output voltage required by the load. Connection lines 6 direct power to the common load bus under the NC state of Contactor 21, whereas power is directed via connection lines 7 from the DC-DC Converter 24 output under the case of low UCS bus 4 voltage.

A delay corresponding to the known response time of the DC-DC converter 24 ensures that opening of Contactor 21 connection to the output bus lines 6 does not cause momentary sagging of the ESS output voltage (alternative control designs may equivalently serve to ensure smooth operation of the ESS output bus during switching). A Regulated Power Supply 11 is connected to the UCS bus 4 via connections 9 and 10, to provide controlled, logic level power supply to the Comparator Circuit 14. Regulated Power Supply 2 19 provides a controlled DC level to operate the coil in Contactor 21 and is supplied by the UCS bus 4.

Figure 2:
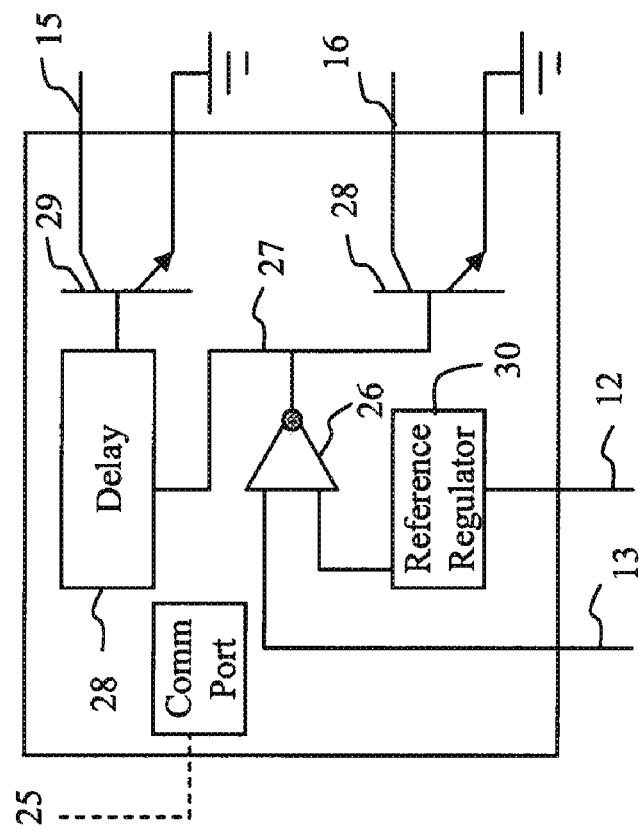
FIG. 2 is a schematic of the comparator circuit

FIG. 2 displays the Comparator Circuit 14 wherein connection line 12 receives regulated power from Regulated Power Supply 1 11, delivering controlled logic-level voltage as reference input to the low-side of the Comparator 26 via the Reference Regulator 30. Connection line 13 provides the high-side input to the Comparator 26 from the positive line of UCS bus 4. When the difference between the Comparator 26 inputs falls beneath the threshold value connection line 27 energizes Power Transistor 28 sending the inhibit release signal to the DC-DC Converter 24 via connection line 16. Connection line 27 also activates the Delay 28 which activates Power Transistor 29 (after its prescribed delay, or similar control function) which, via connection line 15 enables Regulated Power Supply 19, which then power the coil in the Contactor 21 via connection line 20.

A serial hybrid drivetrain represents one application benefiting from the prescribed apparatus, and serves to illustrate component types, requirements and advantages and feasibility of the apparatus. In this case, there exist varying, and high current demands to and from the motor-generators which drive the vehicle wheels. In one example where system weight and efficiency are of high priority, a lightweight and high charge/discharge rate, and high efficiency of energy transfer, the prescribed UCS-based ESS apparatus is particular advantage. An example system design has a DC generator as its DC Source 1. In an example case of a 48V system bus, a single Maxwell BMOD00165-E048 UltraCapacitor provides 50 Watt-hr of capacity, a discharge rate maximum of 93 kW and maximum short circuit current of 4800 Amps. A Curtis Albright SW1000A DC contactor affords 1000 A expected maximum application requirements, and consumes 30 W of coil power when activated. American Power Design's H30 DCDC converter supplies the Contactor coil power over the wide range of input voltage. A Dallas Semiconductor Max5090A affords regulated 3.3V power to the National Semiconductor LM139 comparator over an input voltage range of 6.5 to 76V. A Logiclevel, 5V signal from LM139 drives power transistor VN02NSP by STMicroelectronics, enabling the DC-DC converter 24 and the delay 26. A typical 48V brushless DC motor having 95% efficiency and a controller of similar efficiency exhibits a functional input range of 40 to 50 VDC and exhibits combined efficiency of 90%. When applied to single unit of the described UC, the UC output would be below the useable range of the motor controller in 1 second, when drawing at a 500 amp rate. Utilizing the prescribed apparatus of this invention and using available high-efficiency DC-DC converter technology having a 2:1 input range from 20-40 Volts, 500 amps could be then drawn for 5 additional seconds, an increase of 500%. The use of the upconversion device in only the lower voltage or state-of-charge condition averts the upconversion loss when not required. When such a system is in regenerative mode, the vehicle application controller signals the Comparator Circuit 14 closing the Contactor 26 enabling reverse energy flow to the UCS 3. This all-UC based design permits full-rate regenerative braking energy flow from the wheel motor-generators, where other designs either waste the excess energy in heat, or require additional storage. In operational cases where the UCS 3 is currently at a full SOC, additional UCS 3 storage would also be required when regenerative braking energy becomes available, however, this is accommodated in design with a larger UCS system in the prescribed apparatus 5 and is more efficient in energy transfer and weight than a combined battery system, translating to higher vehicle efficiency.

The above descriptions relate to UC storage devices, however, the present invention is applicable to control of other storage elements exhibiting voltage reduction under system loading, wherein the application system can benefit from extended energy extraction from the storage elements at their reduced voltage output.

Herein, the invention has been described with reference to specific embodiments, however, modifications and variations of the invention may be constructed without departing from the scope of the invention as it is defined in the following claims.

REFERENCES 7,004,273 2/2006 Greenwald, et al. 180/65.1
6,265,851 7/2001 Brien, et. al. 320/162
2004/0100149 Lai 307/82

What is claimed is:

1. A energy management system for controlling the energy from a power source, including a super capacitor, to a load, comprising:
   a comparative circuit for monitoring a primary voltage from the power source, the comparative circuit capable of detecting a normal voltage range and a low voltage range along a power bus;
   a contactor switch in series between the power source and a load; the switch configured to operate in both a normal mode and a low voltage mode, wherein the switch is closed in a normal mode to allow current to pass directly to the load from the power source on the power bus and the switch is open in the low voltage mode to prevent direct flow of current to the load from the power source;
   a DC-DC boost converter connected to the primary voltage, the boost converter in communication with a control signal from the comparative circuit and the boost converter is electrically connected to a load, wherein the control signal inhibits the operation of the DC-DC boost converter in the normal voltage mode and enables the operation of the DC-DC boost converter in the low voltage mode; and wherein the low voltage mode is caused by draining the super capacitor below a threshold level.

2. The system of claim 1 wherein the low voltage range is less than seventy percent of the power supply capacity.

3. The system of claim 1 wherein the DC-DC boost converter provides a higher boost as the voltage detected by the monitoring circuit decreases.

4. The system of claim 1 further comprising a delay circuit electrically connected to the contactor switch.

5. The system of claim 1 wherein the comparison circuit is further configured to monitor voltage at the load and to close the contactor switch when the voltage associated with the load exceeds a threshold to provide for re-charge of the superconductor.

6. A method of driving a load from a power source including a high power density storage device, comprising:
   driving a load through a closed contactor switch from the power source directly to the load along a power bus;
   monitoring a voltage provided by the power source along the power bus;
   switching the path of the power to an upconverter circuit by opening the contactor switch responsive to the monitoring step;
   and monitoring voltage associated with the load and reversing the path of the power through the contactor switch when the load voltage exceeds a threshold.

7. The method of claim 6 wherein the switching step is performed when the voltage on the power bus drops below a threshold level.

8. The method of claim 7 wherein the threshold level is defined as the monitored voltage less than seventy percent of maximum.

9. The method of claim 6 wherein the upconverter circuit is a DC-DC boost circuit.

10. The method of claim 6 wherein the upconverter circuit provides increased boost as the monitored voltage drops.

11. A controller for controlling power from a power storage element to a load, comprising:
    a circuit for comparing a storage element output bus voltage to a threshold value, wherein the circuit has a first output which directs the opening of a switch when the output bus voltage is below a threshold value, and closing the switch when the output bus voltage is above the threshold value,
    the circuit having a second output electrically connected to an upconversion device that enables or inhibits the upconversion device based on the output bus voltage; and
    a regulated power supply for sustaining the circuit within operating parameters while the storage system output bus varies significantly in voltage.

12. An energy storage system comprising:
    an energy storage element having a direct current (DC) output voltage which output voltage decreases as energy is released;
    a DC output bus connected to the energy storage element and an external load bus;
    an upconversion circuit having input terminals and output terminals wherein the upconversion circuit provides a voltage increase from the input terminals to the output terminals, and wherein the output terminals are connected to the external load bus;
    a parallel bus connecting the upconversion circuit to the DC output bus;
    a switching circuit comprising a contact switch, the switching circuit connected to the DC output bus and configured to enable current to pass directly from the energy storage element to the external load bus in a first switch position and to enable current to pass from the energy storage element to the upconversion circuit in a second switch position;
    a monitoring circuit in electrical connection with the DC output bus and the external load bus; the monitoring circuit having an output control signal in electrical connection with the switching circuit, and an inhibit signal electrically connected to the upconversion circuit, and wherein the monitoring circuit is configured to compare the DC output bus voltage with a threshold value and to operate the output control signal and the inhibit signal as a function of that comparison.

13. The energy storage system of claim 12 wherein the monitoring circuit controls the switching circuit such that the switch is in the first position and the upconversion device is inhibited when the DC output bus voltage is above the threshold and the switch is in the second position and the upconversion device is enabled when the DC output bus voltage is below the threshold.

14. The energy storage system of claim 13 wherein the monitoring circuit also operates the output control signal and the inhibit signal as a function of the external load bus voltage and controls the switching circuit such that the switch is in the first position and the upconversion device is inhibited when the external load bus becomes a generating source of power such that the power is directed back to the energy storage element.

15. The energy storage system of claim 12 wherein the monitoring circuit also operates the output control signal and the inhibit signal as a function of the external load bus voltage and controls the switching circuit such that the switch is in the first position and the upconversion device is inhibited when the external load bus becomes a generating source of power such that the power is directed back to the energy storage element.

* * * * *

UNITED STATES PATENT AND TRADEMARK OFFICE
CERTIFICATE OF CORRECTION

PATENT NO.      : 7,642,755 B2
APPLICATION NO. : 11/613014
DATED           : January 5, 2010
INVENTOR(S)     : Bradley Wayne Bartilson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this

Twenty-first Day of December, 2010

David J. Kappos
*Director of the United States Patent and Trademark Office*